June 8, 1926.
J. P. JOHNSON
1,588,028
MOTOR VEHICLE TRANSMISSION
Filed Oct. 16, 1925
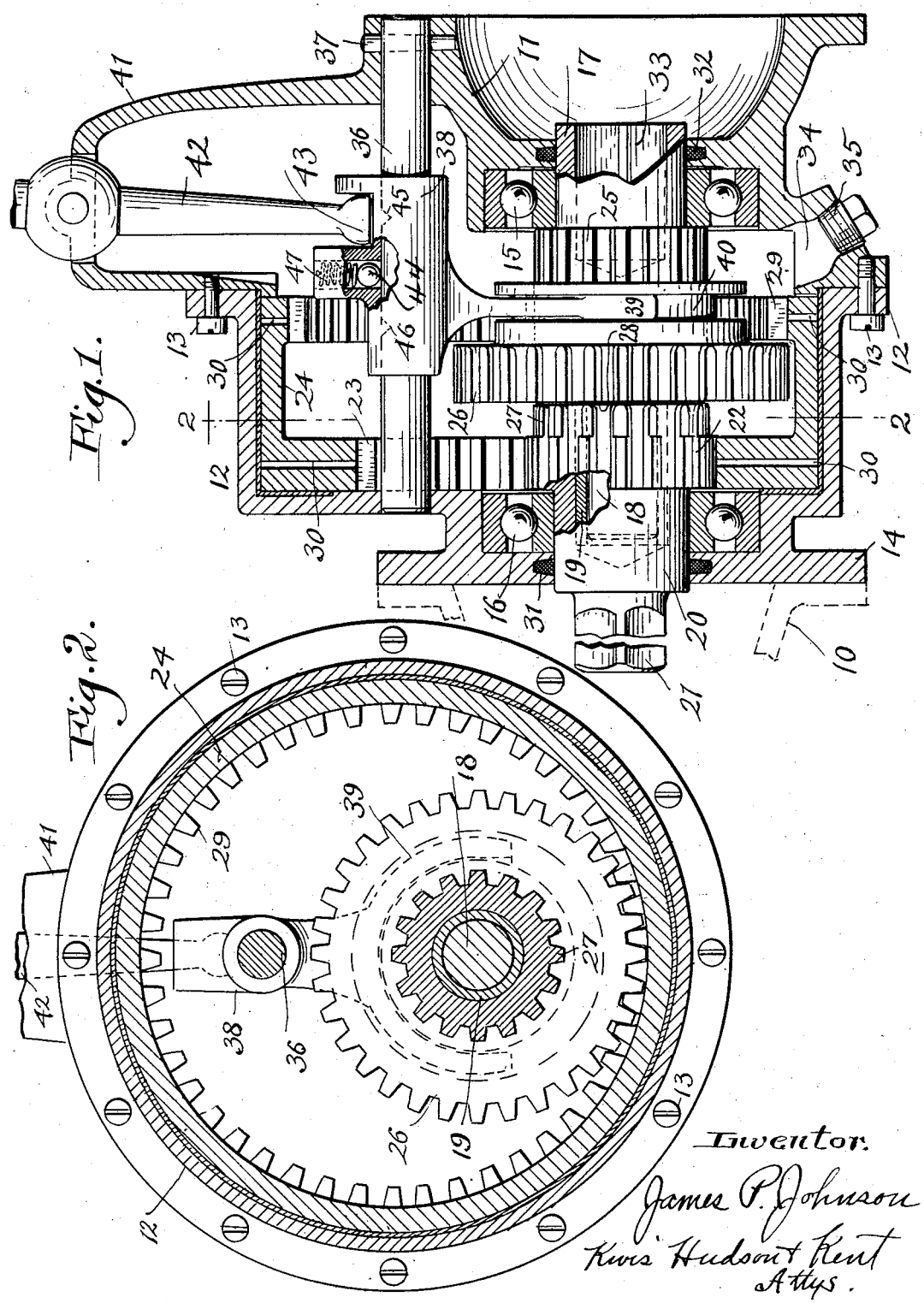
Inventor.
James P. Johnson
Kwis Hudson + Kent
Attys.

Patented June 8, 1926.

1,588,028

UNITED STATES PATENT OFFICE.

JAMES P. JOHNSON, OF CLEVELAND HEIGHTS, OHIO.

MOTOR-VEHICLE TRANSMISSION.

Application filed October 16, 1925. Serial No. 62,738.

This application relates to gearing and more particularly to supplemental gearing to be used in connection with the regular transmissions, with which vehicles are ordinarily equipped, for the purpose of giving an increased number of speed ratios so as to provide either an increased or decreased speed reduction ratio.

It is one of the objects of the invention to provide a relatively simple, compact and light form of supplemental gearing, for the purposes specified, that may be readily used with standard forms of transmission gearing and which will comprise relatively few parts so that it may be manufactured and sold at a low cost. A further object of the invention is to provide a supplemental gearing, for the purposes specified, that will be relatively quiet in operation and easily and reliably controlled and that will also be durable and so constructed as to cause the minimum amount of trouble in service.

Other objects of the invention and the features of novelty will be apparent from the following description taken in connection with the accompanying drawings, of which:

Fig. 1 is a longitudinal section through a gearing embodying my invention; and Fig. 2 is a transverse section thereof on the line 2—2 of Fig. 1.

In the drawings I have illustrated a form of supplemental gearing that is especially adapted for use in connection with the Ford automobile, being secured to the rear end of the Ford transmission housing which is indicated, at 10, in dotted lines. In applying the gearing to the Ford automobile, the propeller shaft is shortened and the rear end of the housing section 11 is made uniform with the rear end of the Ford transmission housing so as to interchangeably receive the usual universal joint at the forward end of the propeller shaft and through which the power is transmitted to the propeller shaft.

The housing for the supplemental gearing comprises the section 11 and the section 12 which are secured together by cap screws or bolts 13 permitting the sections to be readily separated for the purpose of giving access to the internal mechanism. The section 12 is provided with a flange 14 which is screwed to the end 10 of the Ford transmission housing so that it may be readily bolted thereto. Supported within the sections 11 and 12 are ball bearings 15 and 16, the bearing 15 supporting one end of the member 17, the other end of this member being provided with a pilot 18 which is supported in a bearing 19 arranged in the inner end of the member 20 which is, in turn, supported by the bearing 16. The member 20 has an extension 21 that is squared, as shown, to fit a similarly formed socket in the final-drive member of the Ford transmission. The member 20 is formed with integral gear teeth 22 which mesh with the internal gear 23 which is an integral 70 part of the annular member 24 that is rotatably supported in the housing section 12, as shown. The member 17 is provided with external splines 25 which are of the same pitch as the teeth 22, being, in effect, stub teeth on which a shiftable gear 26 is slidable, this gear being provided with internal splines to fit the splines 25 so that the gear 26 is non-rotatable with respect to the member 17. At the inner end of the member 20, the teeth 22 are turned down so as to conform in shape and height to the splines 25, as shown at 27. The splines 25 abut against the inner end of the member 20, as indicated at 28, so that the gear 26 may be moved into engagement with the splines 27 for the purpose of locking the members 17 and 20 together. The ends of the splines 27 are preferably chamfered to facilitate meshing with the internal splines of the gear 26 and the teeth of the gear 26 are chamfered at their right-hand ends, as seen in Fig. 1, to facilitate meshing with the internal gear 29, which is an integral part of the member 24. As will be seen from the drawings, the member 24 and the internal gears 23 and 29 are eccentrically arranged with respect to the axis of the members 17 and 20 and the outer surface of the member 24, which runs in a bearing of suitable material in the housing section 12, is lubricated by the oil passages 30. The usual felt ring 31 is arranged in the housing section 10 to cooperate with the hub of the member 20 to prevent the leakage of lubricant and also to keep dust and dirt and other objectionable materials out of the housing. The housing section 11 is also provided with a felt ring 32 which cooperates with the hub of the member 17 for a similar purpose. The rearward end of the member 17 is provided with a square opening 33 adapted to receive the squared end of the universal joint (not shown) or the end 21 of a second supplemental gearing unit in case it is desired to use more than one of these units in serial arrangement for the purpose of providing additional speed ratios.

In the lower part of the housing section, there is a cavity 34 in which dirt, particles of metal or other objectionable materials may collect, this cavity being closed by a plug 35 which may be removed, when desired, for the purpose of draining and cleaning the interior of the housing.

A shaft 36 extends longitudinally through the housing, being suitably supported in the sections 11 and 12 and held stationary therein by a pin 37. A shifter member 38 is arranged on the shaft 36 and has a yoke 39 which engages a groove 40 in the hub of the gear 26 so that the gear may be moved in an axial direction by the member 38. There is an upward extension 41 on the housing section 11 in which there is pivoted a shifter lever 42, the upper end of which will be positioned for convenient operation from the interior of the vehicle. The lower end of the lever 42 engages with the member 38, as indicated at 43, and the member 38 carries a ball detent 44 which is adapted to engage with either of the recesses 45 or 46 for the purpose of positioning the gear 26 either in engagement with the splines 27 or with the internal gear 29. The ball 44 is backed up by a spring 47 which is adapted to press the ball into either of the recesses 45 or 46, the spring 47 offering sufficient resistance to the disengagement of the ball 44 from either of these recesses, to firmly hold the member 38 and the gear 26 in either of their operative positions.

When the gear 26 is moved to the left, from the position in Fig. 1, so as to engage with the splines 27 and, directly connect the member 20 with the member 17, there will be a direct drive through the supplemental gearing without any change in speed but when the gear 26 is shifted to the right, so as to engage with the internal gear 29, the drive will be through the gear 22 to the internal gear 23, which is a part of the member 24, and thus rotate the internal gear 29, the latter rotating the gear 26 and the member 17 at a considerably reduced speed as compared with the speed of the member 20. When the member 17 is used as the driver and the member 20 is the driven element, of the supplemental gearing, there will be a direct drive, without change of speed when the gear 26 is in engagement with the splines 27 but when the gear 26 is meshed with the internal gear 29, the member 20 will be rotated at a greater speed than the member 17.

From the foregoing, it will be apparent that I have provided a comparatively simple and compact supplemental gearing that will be quiet in operation because of its compactness, relatively few gears and the fact that the points of meshing are submerged in lubricant. The construction has the further advantage of being relatively short, in the axial direction, so as to avoid an excessive overhang from the regular transmission gearing of the automobile and also to require only a minimum amount of shortening of the propeller shaft, it being desirable to keep the propeller shaft as long as is permissible in order that the angularity thereof will not be excessive. The housing is adapted to contain an adequate amount of lubricant for the purpose of thoroughly lubricating all of the working parts and the various bearings, although compactly arranged, may be of generous portions so as to have great durability and reliability of operation. By providing the oil passages 30, the bearing for the member 24 will receive oil under pressure due to the centrifugal force on the oil between the teeth of the gears 23 and 29 and the meshing of the gears 22 and 26 therewith at the point where lubricant is most needed.

It will be noted from Fig. 1 that the gear 26 has a very limited neutral position and in being shifted engages with the gear 29 almost immediately upon being disengaged from the splines 27, and vice versa and, on account of the fact that the gears are all rotating in the same direction and have only a relatively small difference in speeds, it will be possible to easily shift the gear 26 from one of its positions to the other without liability of being stalled in its neutral position. This feature is of especial advantage in connection with the transmission mechanism of the Ford automobile because of the fact that the ordinary service brake is a part of the transmission and it is desirable, from the standpoint of operation, to have the transmission mechanism connected with the propeller shaft at all times.

Having thus described my invention, what I claim is:

1. In gearing for the purpose specified, the combination of a housing, aligned relatively rotatable members, each of said members having a gear thereon that is rotatable therewith, one of said gears being axially movable on the member which carrier it, a rotatable member eccentrically mounted in said housing with respect to the first-mentioned members and having two internal gears thereon one of which is permanently meshed with one of the first-mentioned gears, and means for shifting said axially movable gear into a position in which it is interlocked with the first-mentioned members, or into mesh with the other of said internal gears.

2. In gearing for the purpose specified, the combination of a housing, aligned relatively rotatable members, one of said members having a gear fixed thereon and external splines, the other of said members having external splines and a gear slidable thereon into and out of engagement with said external splines, a member rotatably mounted in said housing and having internal gears one of which is permanently meshed with the first-mentioned gear, and means whereby the second-mentioned gear and the other of said internal gears are brought into meshing relation.

3. In gearing for the purpose specified, the combination of a housing having aligned bearings arranged therein, two aligned relatively rotatable members each of which is mounted in one of said bearings, said members having telescoped parts whereby each serves as a support for the other between said bearings, one of said members having an external gear fixed thereon and the other having external splines corresponding in number and arrangement with the teeth of said gear, a gear slidable on said splines, an annular member rotatably mounted in said housing and having two internal gears which are eccentric to the axis of the first-mentioned members, means for moving said slidable gear into mesh with the teeth of one of said external gears or with one of said internal gears, the other of said internal gears being permanently meshed with the first-mentioned gears, and ratios of the pairs of meshing gears being different so that either of the first-mentioned members may drive the other at different speed ratios depending upon the position of said slidable gear.

4. In gearing for the purpose specified, the combination of a housing, aligned relatively rotatable members, each of said members having a gear thereon that is rotatable therewith, one of said gears being axially movable on the member which carries it, a rotatable member eccentrically mounted in said housing with respect to the first-mentioned members and having two internal gears thereon one of which is permanently meshed with one of the first-mentioned gears, and means for shifting said axially movable gear into position to be driven at the same speed as the other of the first-mentioned gears or into mesh with the other of said internal gears.

In testimony whereof, I hereunto affix my signature.

JAMES P. JOHNSON.